UNITED STATES PATENT OFFICE.

WILHELM SCHÄFER AND ARTHUR HEINEMANN, OF BERLIN, GERMANY, ASSIGNORS, BY MESNE ASSIGNMENTS, TO THE INTERNATIONALE ELECTRICITÄTSWERKE UND ACCUMULATOREN-FABRIK ACTIEN-GESELLSCHAFT, OF SAME PLACE.

ELECTRODE FOR ELECTRICAL APPARATUS.

SPECIFICATION forming part of Letters Patent No. 566,231, dated August 18, 1896.

Application filed October 8, 1894. Serial No. 525,297. (Specimens.) Patented in Austria July 27, 1894, No. 44/3,552, and in Luxemburg September 15, 1894, No. 2,113.

*To all whom it may concern:*

Be it known that we, WILHELM SCHÄFER and ARTHUR HEINEMANN, of Berlin, Germany, have invented certain new and useful Improvements in and Relating to Electrodes for Electrical Apparatuses, (for which we have obtained Letters Patent in Luxemburg, No. 2,113, dated September 15, 1894, and partly in Austria, No. 44/3,552, dated July 27, 1894;) and we do hereby declare the following to be a clear and exact description of the invention.

Our invention has relation to electrodes for secondary or storage batteries and to the mode of producing the same or the active material therefor. As is well known, the efficacy of these electrodes depends solely upon their capacity of taking up or storing oxygen and hydrogen in certain chemical combinations and in their capacity under given conditions of converting these elements into electric energy. It is therefore obvious that such elements should possess a storing capacity of the highest degree. On the other hand, the cost of maintenance of a storage battery depends essentially upon the durability of the electrodes, irrespective of their efficiency. Consequently an efficient and economical storage battery can only be obtained when the electrodes possess in the highest degree the capacity of storing oxygen and hydrogen and when they are capable of resisting to the greatest possible extent the influence of external mechanical effects as well as the internal molecular action which takes place under the chemical conversions that occur in charging and discharging and resulting in expansion and contraction, which has heretofore been the great source of destruction.

It has heretofore been the practice to use an active material made of metallic lead or lead compounds mixed with a suitable inert or non-conductive binding agent in order to admit of the application of the material and its adhesion to the support for such material as a lead grid. In order to bind the particles of material together, the binding agent has to be used in comparatively large quantities and has to be of such a nature as to resist the action of the sulfuric acid used in the battery. Hence only electically inert or non-conductive substances can be employed for the purpose.

The use of a binding agent such as described is one of the primary causes of the comparatively speedy destruction of the electrodes, as it undergoes no expansion and contraction, that is to say, there are no molecular actions such as take place in the active material under well-known conditions of use, so that the components become readily separated, resulting in the disintegration of the electrode.

Our invention has for its object the provision of means whereby the disadvantages or defects referred to are entirely avoided and an electrode obtained in which each particle of lead will exert its full chemical, and consequently its full electrical, action, and in which the particles of lead are mutually and firmly united or bound together, and this result we obtain by the use of glycerate of lead in the construction of the electrodes.

Glycerin has the property of forming with lead oxid a compound which, according to the proportions of the components, will in a few minutes set and become as hard as stone, this being due to the formation and intergrowth of the crystals of lead glycerate, the compound having the following composition:

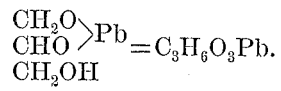

According to our invention the lead glycerate is converted into a chemical compound of peroxid of lead and peroxid of manganese, *i. e.*, a lead salt of manganic acid ($PbO_2Mn O_2$) under simultaneous oxidation or decomposition of the glycerin. This we effect by subjecting the glycerate to the action of an electric current in the presence of a solution of an alkali metal permanganate (sodium or potassium permanganate) acidulated with sulfuric acid, the reaction taking place according to the following equation:

$$2C_3H_6O_3Pb + 2KMnO_4 + H_2SO_4 = K_2SO_4 + 2PbO_2MnO_2 + C_3H_4O + C_3H_4O_2 + 3H_2O.$$

Inasmuch as the product of the above reaction, namely, the lead salt of manganic acid, ($PbO_2MnO_2$, or $PbMnO_4$,) is obtained in the form of a solid or self-sustaining body, it can be used as an electrode for storage batteries. On the other hand, the electrode may be constructed in the usual manner, namely, of a conductive carrier to which the active material is applied, in which case the carrier of suitable construction, as in the form of a grid and of a conductive material capable of resisting the action of sulfuric acid, as lead, is used, to which the lead glycerate is applied while still in a plastic condition, after which the glycerate is subjected to the action of an electric current in presence of an acid containing a permanganate of a metal of the alkalies, as a solution of potassium or sodium permanganate acidulated with sulfuric acid, whereby the glycerin is oxidized or decomposed, the peroxid of manganese separated, and the lead glycerate converted into a lead salt of manganic acid, i. e., of dioxid of lead and dioxid of manganese chemically combined. In this conversion we employ a sulfuric-acid solution of about 16° Baumé, the strength of the current being gradually increased and the liquid kept cool. The proportion of alkaline metal permanganate to be added to the sulfuric-acid solution is determined by the quantity or volume of the bath, while the latter will depend upon the dimensions of the electrode. In practice we prefer to add the alkali metal permanganate gradually, and preferably whenever discoloration of the liquid sets in.

We would remark here that in the production of electrodes or active masses for accumulators as heretofore practiced, and in which lead and glycerin are used as components, the glycerin simply performs the function of a binding material for the different components of the electrode, while in such processes wherein lead and an alkali metal permanganate are components the latter yields up oxygen instead of manganese in the formation of the manganic salt. In our process the glycerin is employed solely in the formation of the lead glycerate, such glycerin being afterward oxidized or decomposed by the action of the electric current, while the lead and permanganate enter into chemical combination, in contradistinction to mechanical admixture, resulting in a product having essentially the composition $PbO_2MnO_2$, or $PbMnO_4$. This salt has the property, when the electrode is charged with electricity, to take up oxygen and hydrogen and give off permanganic acid, which in the electrolytic process is soluble in the sulfuric acid, the reaction taking place as follows: $PbO_2MnO_2 + H + O_2 = PbO_2 + HMnO_4$.

In discharging or giving off current the original salt $PbO_2MnO_2$ is reconstituted, so that we may say that the salt is conditionally soluble in the electrolyte.

In view of the chemical, instead of the merely mechanical combination between the conductive carrier and the active agent, the electrode so obtained is of far greater solidity, hence durability, than the electrodes heretofore used in storage batteries, because the active material is not subjected to the disintegrating actions that influence electrodes of usual construction, nor is said active material detrimentally effected either by shocks or vibrations or protracted use, nor is it liable to warp or buckle, either during charging or discharging, while its expansion is not interfered with in view of the absence of the mechanical binding or cementing agent heretofore employed. Furthermore, owing to the absence of electrically inert or non-conductive matter the capacity and efficiency of a secondary battery constructed with our improved electrodes are not impaired, while its capacity, efficiency, and durability are far greater than those now in use. Thus, for instance, one kilo of our positive-electrode mass will yield one hundred and fifty ampere hours, while the best active agent known will, under the most favorable conditions, yield only one-fifth as much, or thirty ampere hours.

Instead of forming the lead glycerate by the admixture of pure glycerin and lead oxid, raw glycerin may be used. In fact, in the construction of positive electrodes we prefer to use raw glycerin, for the reason that certain constituent impurities thereof have a beneficial effect when present in said positive electrodes, especially when a conductive carrier of hard lead is used to support the active agent, in that said impurities increase the durability, capacity, and efficiency of the electrode, while the cost is materially reduced by the use of raw glycerin. Yet, if desired, these constituents can be added to pure glycerin, thereby getting rid of certain other impurities in the raw glycerin that act more or less detrimentally, though the advantages derived from those impurities which act beneficially are so much greater than the disadvantages due to those impurities that act more or less detrimentally as to admit of the use of raw glycerin in the construction of positive electrodes, while in the construction of negative electrodes pure glycerin is best, and here also a carrier of hard lead is preferred if it be desired to use a carrier.

Raw glycerin, as is well known, contains as impurities lime, non-volatile organic substances, such as fatty acids, albumen, resin, dyestuff, free acids, (oxalic and butyric acids,) insoluble fatty acids, (as oleic acid,) aldehyde arsenious acid, raw sugar, white syrup, and grape sugar.

In the electrolytic treatment of the glycerate some of the inorganic series of these impurities pass over into the electrolyte (lime) and others are gasified, (arsenious hydrogen.) Experiments have shown that butyric acid, hydracrylic acid, lactic acid, and others of the same series, namely, of the fatty series $C_nH_{2n}O_2$ and $C_nH_{2n}O_3$, have a beneficial effect, in that they are converted by electrolysis into carbon oxid, carbonic acid, formic acid, saturated and unsaturated hydrocarbons, Croton aldehyde, &c., whereby the peroxid of lead and manganese molecule formed from the glycerate is influenced in such a manner as to increase the capacity as well as the efficiency of the electrode very materially. The advantage of employing raw glycerin in the preparation of the lead glycerate to be employed in the construction of positive electrodes will, therefore, be readily understood, though, as stated above, these constituents, that is to say, the acids of the fatty series referred to, may, in about the proportions in which they exist in raw glycerin, be added to pure gylcerin, thereby getting rid of such impurities as lime, that act more or less disadvantageously, and at the same time increasing the solidity, capacity, and efficiency of the positive electrodes.

We have found that the best results are obtained by the use of the acids of the fatty series above referred to, namely, those acids containing two or three atoms of oxygen corresponding to the generic formulæ $C_nH_{2n}O_2$ and $C_nH_{2n}O_3$, and of which those having a low percentage of carbon, as formic acid ($CH_2O_2$) and glycol acid ($C_2H_4O_3$) are types.

Experiments have further shown that, as above mentioned, it is more advantageous to employ practically pure glycerin than raw glycerin in the preparation of glycerate of lead for the construction of negative electrodes. It is possible that the lime contained in the raw glycerin is disadvantageous and exerts a detrimental influence upon negative electrodes. It has also been found advantageous to construct negative electrodes from glycerate of lead obtained from practically pure glycerin containing butyric acid or to which butyric acid has been added.

From what has been said above it will be readily understood that a hard or soft lead carrier is not absolutely required in the construction of the electrodes, and that if such a carrier is used the active agent is not liable to become loosened and drop off, as is the case now.

Having thus described our invention, what we claim as new therein, and desire to secure by Letters Patent, is—

1. In a process for producing an active material for electrodes for storage batteries, subjecting a lead glycerate to the action of an electric current in presence of an acid containing a permanganate of a metal of the alkalies, substantially as set forth.

2. In a process for producing an active material for electrodes for storage batteries, subjecting a lead glycerate to the action of an electric current in presence of a solution of permanganate of sodium or potassium acidulated with sulfuric acid, substantially as set forth.

3. In a process for producing an active material for electrodes for storage batteries, combining an acid of the described fatty series with lead glycerate and subjecting the compound to the action of an electric current in an acidulated solution of a permanganate of a metal of the alkalies, substantially as set forth.

WILHELM SCHÄFER.
ARTHUR HEINEMANN.

Witnesses:
 CHAS. H. DAY,
 W. HAUPT.